United States Patent [19]

Shears

[11] 4,269,433
[45] May 26, 1981

[54] RESILIENT REAR SUSPENSION FOR GRADERS

[75] Inventor: W. Allan Shears, Divernon, Ill.

[73] Assignee: Fiat-Allis Construction Machinery, Inc., Deerfield, Ill.

[21] Appl. No.: 101,822

[22] Filed: Dec. 10, 1979

[51] Int. Cl.³ .......................................... B60G 11/22
[52] U.S. Cl. ................................ 280/716; 267/63 A
[58] Field of Search .......... 280/716; 267/63 R, 63 A; 301/125

[56] References Cited

U.S. PATENT DOCUMENTS

| | | | |
|---|---|---|---|
| 1,476,355 | 12/1923 | Borst | 267/63 R |
| 1,825,530 | 9/1931 | Latshaw | 267/63 R |
| 2,747,918 | 5/1956 | Blackwood | 267/63 R |
| 4,171,027 | 10/1979 | Seit | 280/716 |
| 4,213,633 | 7/1980 | Moore | 280/716 |

*Primary Examiner*—Robert R. Song
*Attorney, Agent, or Firm*—August E. Roehrig, Jr.; Robert A. Brown; John A. Doninger

[57] ABSTRACT

A resilient rear suspension for graders for creating an impedance mismatched to attenuate the noise transmitted from the drive gears to the operator's compartment. A resilient elastomeric material is interposed between the axle housing and the suspension trunnion attached to the vehicle. The rear suspension further employs a backing ring to increase fore, aft and lateral stability of the axle with respect to the vehicle frame.

17 Claims, 4 Drawing Figures

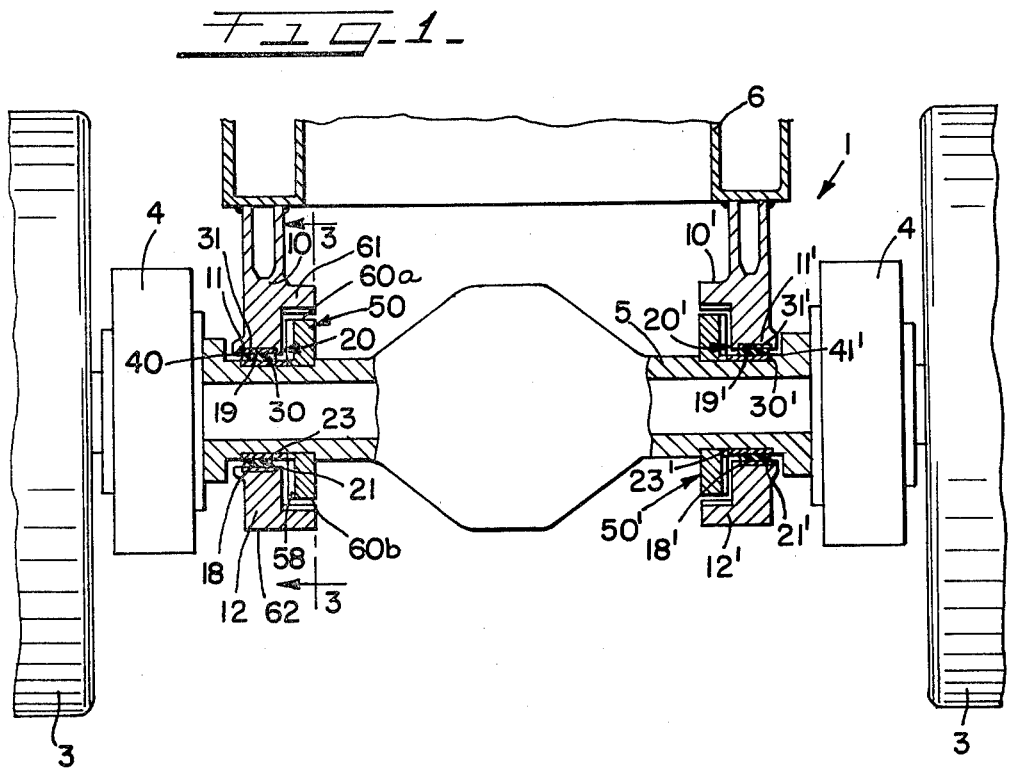
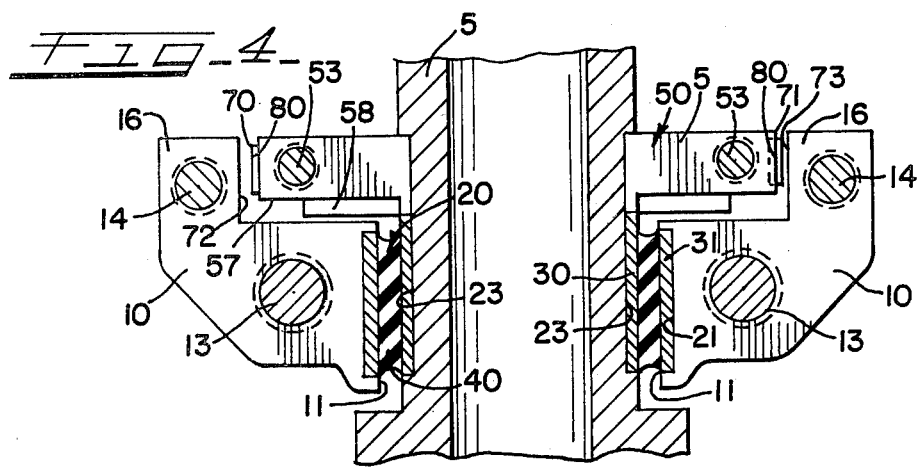

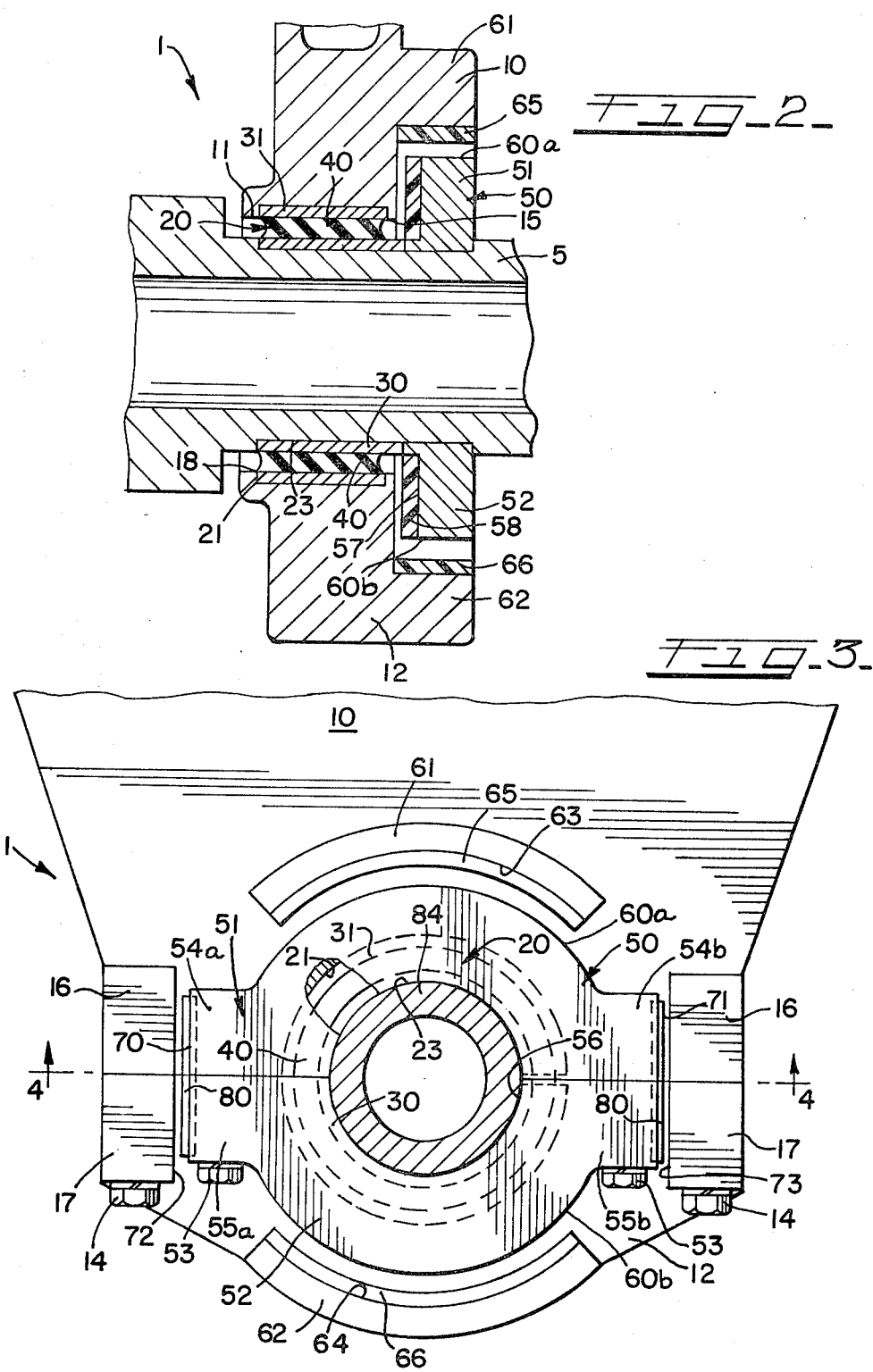

RESILIENT REAR SUSPENSION FOR GRADERS

BACKGROUND OF THE INVENTION

This invention relates in general to vehicles and, in particular, to a vehicle suspension.

More specifically, but without restriction to the particular use which is shown and described, this invention relates to a resilient rear suspension in the rear-axle-to frame joint of a vehicle to attenuate the structural borne noise transmitted to the operator's compartment from the drive gears. The resillient rear suspension of the invention further provides vertical, fore and aft, and lateral stability to improve operation of the vehicle.

In the operation of construction and industrial machinery, such as, for example, conventional road graders, known equipment has subjected the operator to high levels of noise which is transmitted to a large extent from the drive gears of the vehicle to the operator's compartment. Maximum noise occurs generally when the machine is driven or roaded in high gear, often subjecting the operator to discomfort and potential interefrence with his effective operation of the vehicle. Federal regulations now specify stringent exposure levels of noise which are acceptable in the operator's compartment during operation of construction equipment. In the prior art a conventional grader employs a rear axle which is rigidly mounted to the vehicle frame through trunnions that transmit noise from the drive gears to the operator's compartment. A high level of noise transmission from the drive gears to the frame in prior graders is attributable to the rear suspension employing a rigid axle mount with metal to metal contact. This conventional suspension technique thus transmits noise to the operator's cab without significant isolation.

SUMMARY OF THE INVENTION

It is, therefore, an object of this invention to improve the rear suspension of vehicles.

Another object of this invention is to attenuate the transmission of noise from a vehicle drive to its frame.

A further object of this invention is to create a resilient rear axle mount in construction machinery to attenuate noise.

Still another object of this invention is to increase vertical, fore and aft, and lateral stability of an axle with respect to the frame of a vehicle.

These and other objects are attained in accordance with the present invention wherein there is provided a resilient rear suspension for vehicles such as, for example, construction and industrial machinery in the form of road graders and the like to attenuate noise transmitted to the operator's compartment during operation of the vehicle. The suspension of the invention further improves vertical, fore and aft, and lateral stability during machine operation.

DESCRIPTION OF THE DRAWINGS

Further objects of the invention, together with additional features contributing thereto and advantages accruing therefrom, will be apparent from the following description of a preferred embodiment of the invention which is shown in the accompanying drawings with like reference numerals indicating corresponding parts throughout, wherein:

FIG. 1 is an end schematic view, with parts in section, of a resilient rear suspension of a vehicle which embodies the invention;

FIG. 2 is an enlarged partial end view, with parts in section, of the left side resilient mount of the resilient rear suspension of the vehicle of FIG. 1;

FIG. 3 is an end sectional view of the resilient rear suspension of the vehicle taken along line 3—3 of FIG. 1; and FIG. 4 is a bottom view of the resilient rear suspension of the vehicle taken along line 4—4 of FIG. 3.

DESCRIPTION OF THE PREFERRED EMBODIMENT

Referring now to FIGS. 1—4, there is illustrated the improved resilient rear suspension for vehicles of the invention, generally designated by reference numeral 1. Although not intended to be so limited, the resilient rear suspension of the invention is described with reference to use on construction and industrial machinery, such as, for example, conventional road graders. As shown in FIG. 1, the road grader includes a pair of rear wheels 3 and corresponding drives 4 mounted on an axle housing 5. The axle housing 5 is carried by a frame 6 by means of a pair of resilient rear suspensions of the invention, laterally positioned on opposite sides of the longitudinal center line of the road grader. Since the details of the resilient rear suspension 1 on both sides of the vehicle are identical in construction, with the exception of being arranged in a mirror orientation of each other, the elements of the resilient rear suspension 1 on the right side of the axle housing 5, viewing FIG. 1, which correspond with the elements on the left side, will be designated by the same reference numerals primed.

The frame 6 of the grader is coupled to the axle housing 5 by means of trunnions 10, 10', which are laterally spaced on axle housing 5 on each side of the vehicle frame and are respectively affixed to the underside of frame 6 by any suitable technique such as welding and the like. Trunnions 10, 10' include a bottom surface 11, 11' having a curved configuration concentric to approximately one half of the periphery of the axle housing 5, but in spaced relationship thereto. Trunnion caps 12, 12' are coupled to the bottom of trunnions 10, 10' by a suitable attachment technique such as by pairs of bolt assemblies 13 and 14. As shown in FIGS. 2 and 4, the pair of bolt assemblies 13 extend through the main body portion of the trunnion 10 and trunnion cap 12 while the pair of bolt assemblies 14 are positioned respectively through a pair of diametrically disposed projecting rectangular sleeve portions 16 integrally formed on trunnion 10 and a pair of diametrically positioned rectangular sleeve portions 17 integrally formed on trunnion cap 12. The trunnion 10' and trunnion cap 12' are similarly coupled together. Upper surface portions 18, 18' of trunnion caps 12, 12' are of a curved shape to surround the other half of the periphery of the axle housing 5 in spaced relationship. Thus, the lower surfaces 11, 11' of the trunnions 10, 10' and the upper surfaces 18, 18' of the trunnion caps 12, 12' form spaced continuous surfaces of revolution 19, 19' surrounding the axle housing 5 as ilustrated in phantom in FIG. 3.

Elastomeric ring assemblies 20, 20' are positioned within the space between the surfaces of revolution 19, 19' and the axle housing 5 and concentrically surround the longitudinal center line of the axle housing. The surfaces of revolution 19, 19' include continuous recesses 21, 21' to receive the periphery of the ring assemblies 20, 20' for retention. The inner periphery of the elastomeric ring assemblies 20, 20' are retained on the axle housing 5 against axial movement by means of recesses 23, 23' formed on the axle housing 5.

The elastomeric ring assemblies 20, 20' include a pair of inner and outer metallic shells or rings 30, 30' and 31, 31' between which suitable elastomer rings 40, 40' are bonded respectively to the steel rings 30, 30' and 31, 31'. The elastomeric rings 40, 40' may be constructed of any suitable substance having resilient physical characteristics to create an impedance mismatch between the axle housing 5 and the grader frame 6 to attenuate the noise transmitted through the suspension by virtue of operation of the vehicle. To facilitate installation of the elastomeric ring assembles 20, 20' on the vehicle, the elastomeric assemblies 20, 20' are radially cut in half and, when installed, are maintained in operative fixed position between the trunnion and trunnion caps and the axle housing 5 as best shown in FIG. 3.

The resilient rear suspension 1 is also provided with an improved arrangement to restrain lateral and vertical movement of the frame 6 with respect to the axle housing 5, and effect fore and aft stability. Restraint of lateral movement is attained in accordance with the present invention by stabilizing means in the form of backing rings 50, 50' suitably attached in recesses 23, 23' in concentric relationship to axle housing 5, and in inward spaced relationship from trunnions 10, 10' and trunnion caps 12, 12'. The backing ring 50 comprises a pair of separable members 51 and 52 coupled together as a unitary body by bolt assemblies 53 extending through diametrically opposed coupling sections 54a and 54b of the member 51 lying in respective confronting relationship with coupling sections 55a and 55b of the member 52 as shown in FIG. 3. The members 51 and 52 form an open central portion 56 to surround axle housing 5 as shown in FIG. 4. The members 51 and 52 form an annular planar face 57 on which a layer of wear resistant material 58 is bonded. The wear resistant layer 58 may be fabricated from any suitable material such as, for example, Delrin or Teflon impregnated phenolic and may be bonded to face 57 by a suitable technique such as riveting, adhesive or other affixation method. The planar surfaces of the wear resistant layer 58 confronting trunnion 10 and trunnion cap 12 are arranged to provide free axle movement when the vehicle is being roaded, but provides stability through physical restraining contact between the trunnion and trunnion cap, and the wear resistant layer. Backing ring 50' is constructed with similar components as backing ring 50 for an identical function.

Vertical stability of the vehicle is further provided by the curved peripheral surfaces 60a and 60b of the backing ring 50, which are arranged in spaced confronting relationship to a lateral projection 61 of the trunnion 10 and a projection 62 of trunnion cap 12. The projections 61 and 62 form partial concentric surfaces 63 and 64 having a curved configuration, as best shown in FIG. 3, substantially matching the peripheral surfaces 60a and 60b and supporting wear resilient layers 65 and 66, respectively, of a similar material as wear resistant layers 58. The periphery of ring 50 is arranged to be spaced from the trunnion and trunnion cap with minimum clearance to provide free vertical movement for roading, but stability when the vehicle is grading. In the latter situation, the vertical deflection of the axle housing 5 is limited by contact of the wear resistant layers 65 and 66 with the backing ring 50 to provide vertical restraint and prevent excessive axle deflection during severe vertical moves which may occur in the operation of the grader. The trunnions 10', trunnion caps 12' and backing ring 50' include the same components to achieve fore and aft stability as described herein.

As illustrated in FIGS. 3 and 4, fore and aft stability is achieved by the provision of outer surfaces 70 formed by the coupling sections 54a and 55a and a diametrically opposite outer surface 71 formed by coupling sections 54b and 55b which cooperate with planar inner surfaces 72 and 73 created by the confronting pairs of the sleeve portions 16 and 17, respectively, provided on the trunnion 10 and the trunnion cap 12. Layers of wear resistant material 80, of the type previously described, are bonded in a recess in the surfaces 70 and 71 such that fore and aft stability is attained by physical restraining contact between one or the other of the layers of wear resistant material 80 and a respective surface 72 and 73 formed by the trunnion 10 and trunnion cap 12. The trunnion 10', trunnion cap 12' and the backing ring 50' is similarly provided with the foregoing fore and aft stability improvement.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A resilient suspension for mounting an axle housing to the frame of a vehicle comprising
    trunnion means adapted to be affixed to said vehicle frame,
    said trunnion means having a surface to surround at least a portion of the axle housing of the vehicle in spaced relationship thereto,
    elastomeric means positioned between said surface of said trunnion means and the portion of the axle housing,
    said elastomeric means including an elastomeric section to provide an impedance mismatch between the axle housing and the frame of the vehicle and attenuate the transmission of noise therebetween, and
    stability means mounted in concentric coupled relationship to the axle housing and in spaced relationship to said trunnion means to stabilize the mounting of the axle housing to the vehicle frame.

2. The resilient suspension according to claim 1 wherein said surface of the trunnion means concentrically surrounds the axle housing.

3. The resilient suspension according to claim 2 wherein said elastomeric means comprises a ring assembly operatively coupled to said surface of said trunnion means and the axle housing of the vehicle.

4. The resilient suspension according to claim 3 wherein said elastomeric means includes an outer ring coupled to said surface of said trunnion means and an inner ring concentrically spaced from said outer ring and being coupled to the axle housing.

5. The resilient suspension according to claim 4 wherein said elastomeric material is positioned between said first and second ring in bonded relationship thereto.

6. The resilient suspension according to claim 1 wherein said stability means and said trunnion means include respective spaced surfaces disposed in planes lying substantially perpendicular to the longitudinal axis of the axle housing to restrain the degree of lateral movement of the frame with respect to the axle housing.

7. The resilient suspension according to claim 6 wherein said surfaces of said stability means and said trunnion means contact each other during the application of predetermined side loads imposed on the vehicle to restrain the degree of lateral movement.

8. The resilient suspension according to claim 7 wherein one of said surfaces of said stability means and said trunnion means is formed from a wear resistant material.

9. The resilient suspension according to claim 1 wherein said stability means and said trunnion means include respectively spaced surfaces to establish stability of the frame with respect to the axle housing.

10. The resilient suspension according to claim 9 wherein one of said surfaces of said stability means and said trunnion means is provided with a wear resistant material.

11. The resilient suspension according to claim 1 wherein said trunnion means includes a trunnion and trunnion cap coupled thereto forming said surface to surround at least a portion of the axle housing in spaced relationship thereto.

12. The resilient suspension according to claim 9 wherein said respective spaced surfaces provide vertical stability.

13. The resilient suspension according to claim 12 wherein said respective spaced surfaces are concentrically arranged about the longitudinal axis of the axle housing.

14. The resilient suspension according to claim 12 wherein at least one of said respective spaced surfaces is provided with a wear resistant material.

15. The resilient suspension according to claim 9 wherein said respective spaced surfaces provide fore and aft stability.

16. The resilient suspension according to claim 9 wherein said respective spaced surfaces are disposed in planes lying substantially parallel to the longitudinal axis of the axle housing.

17. The resilient suspension according to claim 6 wherein one of said respective space surfaces is provided with a wear resistant material.

* * * * *